United States Patent
Iaconelli

[15] 3,695,444
[45] Oct. 3, 1972

[54] MEMBRANE SUPPORT
[72] Inventor: William B. Iaconelli, Scituate, Mass.
[73] Assignee: Ionics, Incorporated, Watertown, Mass.
[22] Filed: April 22, 1970
[21] Appl. No.: 30,661

Related U.S. Application Data
[62] Division of Ser. No. 786,634, Dec. 24, 1968, Pat. No. 3,520,803.

[52] U.S. Cl. .................................. 210/321, 210/541
[51] Int. Cl. ............................................. B01d 31/00
[58] Field of Search ...... 204/301; 210/321, 541, 486, 210/433, 459, 490, 491

[56] References Cited

UNITED STATES PATENTS

| | | | |
|---|---|---|---|
| 2,249,063 | 7/1941 | Swem | 210/486 |
| 2,778,096 | 1/1957 | Weema | 210/541 X |
| 3,342,719 | 9/1967 | Chen et al. | 204/301 |
| 3,398,091 | 8/1968 | Greatorex | 210/321 X |

Primary Examiner—Frank A. Spear, Jr.
Attorney—Norman E. Saliba and Aaron Tushin

[57] ABSTRACT

An apparatus for the separation of fluid mixtures having a plurality of three compartment subassemblies or units arranged in pairs, each subassembly consisting of a vapor, a heating, and a feed compartment defined from each other by separating barriers placed therebetween. The vapor compartment is placed common to a pair of subassemblies and contains therein a membrane barrier support structure, both sides of this structure placed in face to face contact with a semipermeable membrane; said vapor compartment associated with fluid inlet and outlet side ports which communicate with fluid conduits serving a pair of identical compartments located in subassemblies that are positioned on opposite sides of the common vapor compartments.

4 Claims, 5 Drawing Figures

INVENTOR
WILLIAM B. IACONELLI
BY Norman E. Saliba
ATTORNEY

INVENTOR
WILLIAM B. IACONELLI

ATTORNEY

MEMBRANE SUPPORT

This application is a division of Ser. No. 786,634 filed Dec. 24, 1968, now U.S. Pat. No. 3,520,803.

This invention relates to a fluid separation membrane apparatus and methods of manifolding the various fluid streams which enter and/or leave the chambers of the apparatus so as to prevent or reduce leakage of one stream into another. Specifically, it concerns the passing of two or more streams of fluid into the appropriate chambers of a multichamber apparatus to prevent undesirable leakage of fluid in a manner which minimizes the the pressure drop associated with manifold fluid flow and maximizes the available active working surface area within the apparatus. It further relates to improved means for supporting the membranes during the fluid separation process to prevent rupturing or deformation of said membranes. For purposes of this disclosure, a fluid is defined as a liquid, vapor, gas or a mixture of the same, and a membrane is defined as a barrier which is differentially permeable to one or more components of a fluid mixture.

Apparatus for carrying out membrane separation processes are frequently of the stack type such as that which is described in U.S. Pat. No. 3,398,091 issued to J.L. Greatorex on Aug. 20, 1968. This patent is in the hands of a common assignee, and the information therein is incorporated herein by reference. The spacers forming the compartments of the apparatus have the shape of open frames and are separated from each other by a membrane or other type of thin barrier. The introduction of fluids into and out of each thin compartment is difficult since the distance between adjacent barriers is small and the fluid streams entering the apparatus must be made to flow in generally parallel planes within the spacer compartments. The introduction and removal of fluid is by means of one or more conduits or manifolds which are generally internally formed within the stack by the alignment or registration of holes or apertures in the gasketing area of the barriers and spacer frames forming the stack. Appropriate fluid inlet and/or outlet manifold holes in each spacer are connected as desired to the fluid flow path area of the compartment in that spacer by a connecting channel formed by removing a section of the spacer frame material. These entrance and exit channels may, for example, form narrow passageways connecting the manifold hole in the spacer with the fluid-holding compartment area. The manifold holes or apertures are located in an appropriate marginal gasketing area or may be in a more centrally located gasketing area. The various fluids which may be circulated through the compartments are hydraulically separated from each other, each fluid being directed to and/or removed from the appropriate compartments by an independent set of inlet and outlet manifold holes.

The membranes or other barriers employed in a separation stack are thin and flexible so that under the application of small differential pressures, bowing, deformation or deflection will occur. The membrane area which is highly susceptible to such deformation is adjacent to and encompassed within the fluid inlet and/or connecting channel area of the spacer. This critical membrane area will tend to deflect or deform into the connecting channel under the pressure applied to gasket the elements of the stack into a fluid-tight arrangement. Such deflection will also occur into a connecting channel when the fluid stream in the compartment, which is on the same side of the membrane as the channel, is circulated under a lower pressure than that on the opposite side of the membrane. The result is that some of the liquid from one conduit stream will pass behind the membrane area which has deformed into the connecting channel of another conduit stream, and thus enter the lower pressured manifold as unwanted foreign material. Deformation is especially serious in membrane processes in which a substantial differential pressure (5 or more p.s.i.) exists between the surfaces of a membrane barrier. Past attempts to overcome the difficult problem of deformation and resulting conduit cross-leak have included an internal manifold or conduit in a series flow arrangement employing one or more stream direction deflecting means as fully described in the heretofore mentioned U.S. Pat. No. 3,398,091. Such fluid flow deflecting means generally comprise two adjacently placed manifold holes located in the same frame side of the gasketing area of a heating compartment spacer with the holes connected to each other by a thin and narrow fluid deflecting path cut out of the same spacer material. The flat heat transfer plate or sheet adjacent to one side of said heating compartment does not contain holes which align with the two holes of the deflecting means and thus forms a flow barrier on that one side of the spacer. This arrangement allows a fluid stream to be received into one manifold hole of the stream deflecting means in a first perpendicular direction to the surface of the transfer plate, pass along the thin connecting deflecting path into the adjacent manifold hole and then flow away from this latter hole in a second perpendicular direction opposite to the first direction. However, because of the narrow deflecting flow path and the sharp 180° turn required of the fluid stream entering and leaving the deflecting means, the hydraulic pressure drop encountered within the said deflecting means is generally excessive and not desirable.

Therefore, it is an object of this invention to provide a novel membrane stack separation apparatus having a flow arrangement for fluid streams wherein the manifold holes and connecting channels in the gasketing area of the spacers are so placed and arranged to reduce the manifold pressure drop in at least one of the fluid conduit streams by reducing the fluid manifold distance within the apparatus and by further reducing the number of sharp turns in the manifold path.

A further object is directed to systems for introducing and/or removing fluid streams to and from closely spaced compartments in a separation stack in a predetermined manner so as to eliminate the necessity of spacers containing high pressure drop stream deflecting means.

A further object is to prevent membrane deformation and undesired leakage of fluid from one compartment of a membrane separation apparatus into another compartment.

A further object is to provide an improved type of membrane supporting grid or structure whereby each membrane is adequately supported against deflection and possible rupturing without obstructing the removal of vapor from the membrane surface.

A further object is to provide a single integral component which functions as both a heat transfer sheet and a fluid feed compartment.

Various other objects and advantages will be particularly pointed out hereinafter in connection with the appended claims.

To better understand the invention, the description and drawings are made with specific reference to a membrane permeation apparatus and process; however, it is not to be construed as limited thereto except as defined in the claims. For a fuller understanding of the invention, reference should be made to the following detailed disclosures taken in conjunction with the drawings wherein like numerals are used to designate like parts.

FIG. 1 is a perspective view of a section of a specific embodiment of a membrane permeation apparatus showing the arrangement of the structural elements in exploded relationship with one another to illustrate fluid feed internal within the apparatus through all the same type compartments in series flow direction. In the embodiment shown, a heating spacer 12 is employed common between each repeating unit pair of the apparatus that is between unit B and C and between unit D and E.

FIG. 2 is also a perspective section of the apparatus showing an alternate fluid flow arrangement for parallel feed to certain compartments within the apparatus and wherein the means for passing fluids into and out of the apparatus are located on the side edges of the vacuum frame spacers 14 which spacers are preferably placed common to a unit pair that is between unit A and B, between unit C and D, etc.

Briefly speaking, membrane permeation will allow the composition of a liquid mixture to be changed by allowing a portion of the mixture to permeate through an appropriate membrane which is more selective to the passage of one or more components of the mixture relative to the remaining components. The components permeating the membrane are removed in the vapor phase. The composition of the permeate vapor recovered at a given temperature and vapor pressure is determined by the composition of the feed mixture and by the nature of the membrane. A membrane which is strongly hydrophilic will allow the selective permeation of water from a mixture but will impede the evaporation of organic constituents. Thus, water can be removed from a coffee extract or from fruit and vegetable juices without removal of any significant fraction of the volatile flavor or aroma constituents.

Figure 1:
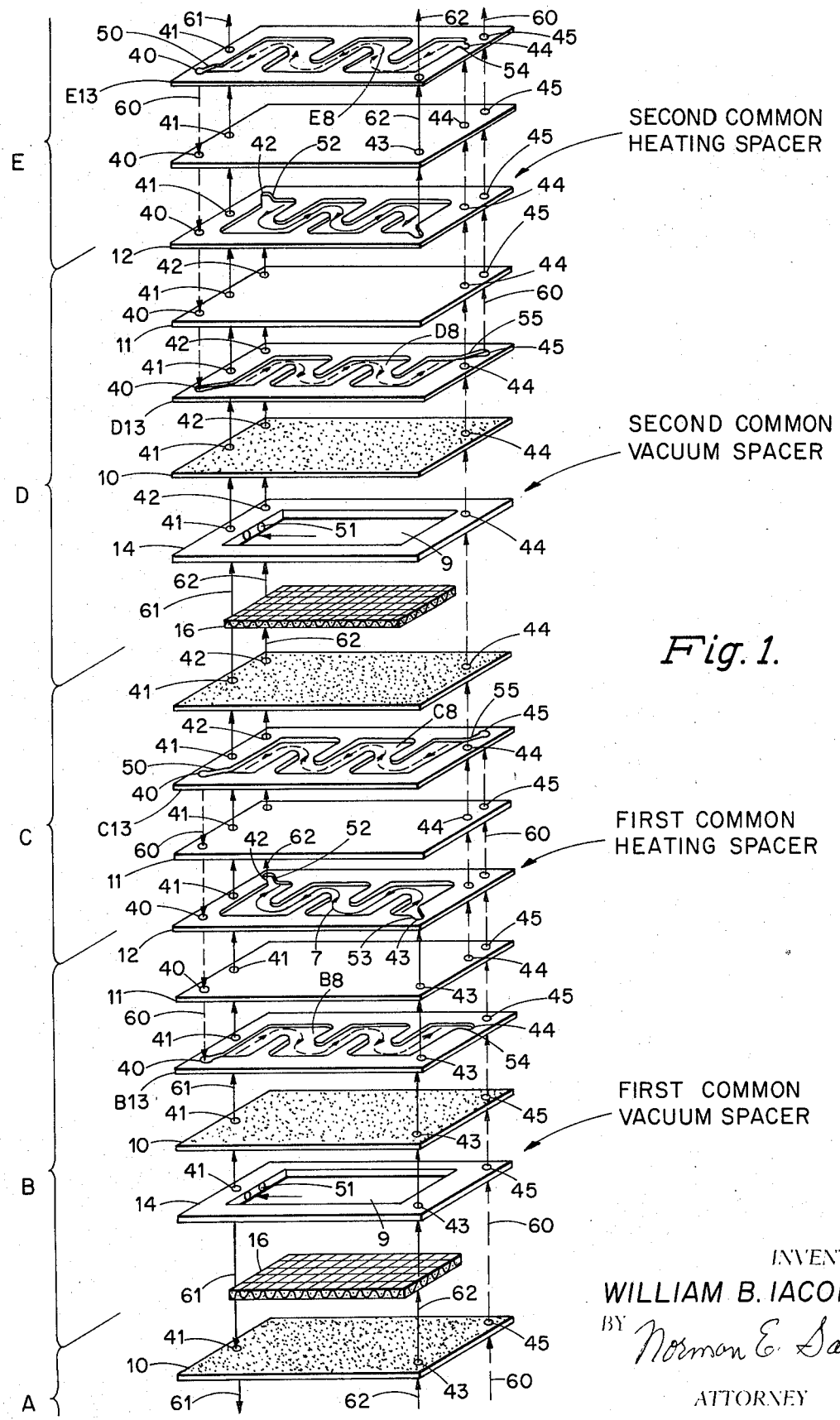
Figure 2:
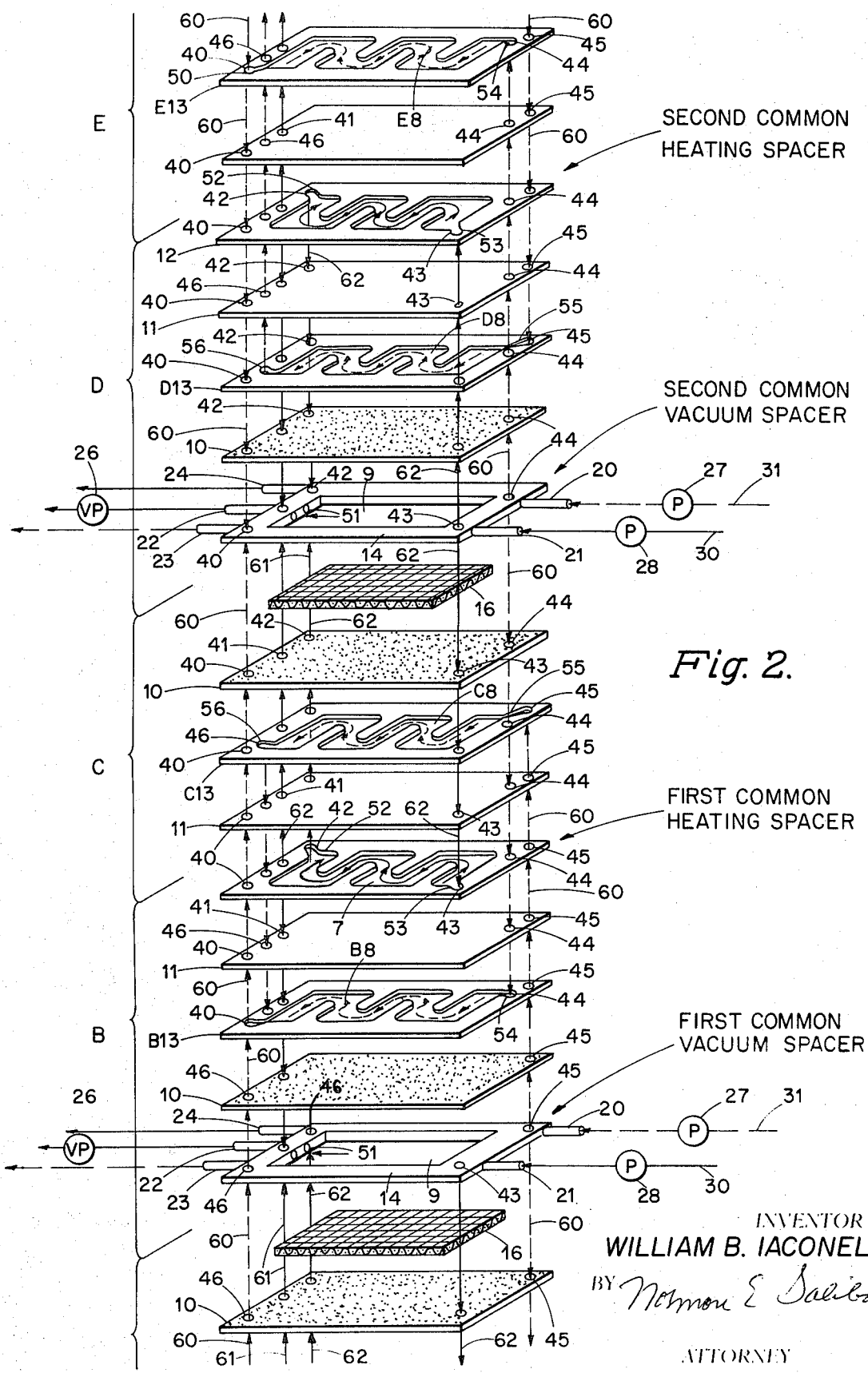

The permeation stack as illustrated in the drawings of FIGS. 1 and 2 is arranged similarly to a plate-and-frame filter type press which may be operated in a horizontal or vertical position and comprises a plurality of basic units or subassemblies A through E placed between a pair of terminal end plates (not shown). It is to be understood that any number of basic units can be employed; the units arranged preferably in pairs in a repeated fashion between the end plates. A fluid-tight stack is obtained by applying the proper pressure against each end plate as by nuts and bolts (not shown) or other well known pressure means. When the stack is operated in a horizontal position a skeleton framework made up of two end supports connected by horizontal, parallel bars or rails may be employed. On these bars a varying number of the frames or spacers forming the compartments of each subassembly can be supported and assembled into a fluid tight stack. The frames would be supported on the rails by means of a pair of conventional supporting arms or handles located on opposite ends of the spacer frames. The elements of the stack can be closed and tightened between the two end plates or heads by a screw or hydraulic ram connected to the moveable head which forces the spacer frames together.

In the apparatus illustrated, each basic unit or subassembly comprises three individual compartments 7,8,9, separated from each other by barriers 10 and 11 with some compartments located common between two units. The heating compartments 7 are comprised of spacer members 12 and fluid feed compartment 8 are comprised from spacer members B13, C13, D13, E13, etc., and are separated from each other by a heat transfer sheet 11 made, for example, of a thin sheet of suitable metal. The required latent heat of evaporation is supplied to the liquid in the feed compartment 8 via the heat transfer sheet by circulating hot water or steam through the heating compartment 7.

The vapor chamber 9 shown common between two subassemblies, that is between subassembly A and B and between subassembly C and D are formed from spacer frame member 14 and are separated from the adjacent feed compartments 8 by a thin semi-permeable membrane 10. Spacer frame member 14 is generally thicker than the other spacers and is conveniently formed of a relatively rigid, chemically inert material such as plastic or stainless steel. Associated with certain sides of each membrane 10 may be gasketing frame means (not shown) to allow the membrane and adjacent rigid spacer members to gasket with respect to one another. Associated with the vacuum spacer member 14 is support member 16 made of fluid-permeable materials such as a porous metal, ceramic or plastic which is preferably held in the rigid frame of spacer 14 and made to fit into the vapor or vacuum compartment 9. The support member is placed in direct face-to-face contact with the adjacent thin membranes to prevent the membranes from rupturing and bursting into the vapor compartment due to the difference of pressure which will exist between the feed and vapor compartments during actual operation. A particularly suitable embodiment of a vacuum spacer member and its associated novel support member is described hereinafter in reference to FIG. 3.

Ideally, the vapor compartment is completely sealed off from the adjacent feed compartments to insure that any fluid entering the vapor compartment will occur only by permeation through the separating semipermeable membrane barrier 10. However, such a condition is not easy to attain due to membrane bowing with the resulting cross leakage of fluid from one compartment to another. Spacer members 12 and 13 have etched or cut out central portions which preferably define a tortuous fluid-flow path area for the heating compartments 7 and feed compartments 8. These compartments are confined by the frame of the spacer; said frame also functioning as a gasket with respect to the elements of the stack adjacent thereto. The flow path may also incorporate means (not shown) for promoting turbulent flow of fluids along the flow path area as fully disclosed in the U.S. Pat. Nos. 2,708,658 issued May 17, 1955 in the name of N. W. Rosenberg and 2,891,899 issued June 23, 1959 in the name of E.A. Mason.

The membranes 10 employed for permeation are well known in the art. Each membrane is formed as a non-porous sheet or film made of an organic polymer such as natural and synthetic rubbers, neoprene, polybutadiene or other polyolefins, polyvinyl chloride, copolymers of vinylchloride-vinlidene acrylonitrile, polyvinyl butyral, cellulose esters such as cellulose acetate, cellulose propionate, cellulose benzoate, cellulose nitrate, cellulose acetate-propionate, cellulose ethers such as ethyl and methyl cellulose, ion-exchange membranes, etc., to mention but a few of the many polymers that may be used. It is to be understood that the membrane material is chosen according to its permeation characteristics inasmuch as polymers of the type described exhibit different selectivities with respect to different liquids; hence, the choice depends on the nature of the mixture sought to be separated. In order to obtain high permeability the membranes are quite thin preferably ranging in thickness, for instance, from 0.0001 – 0.01 inches.

In the apparatus, particularly that illustrated in FIG. 1, each terminal pressure plate (not shown) may be provided with inlet and/or outlet connector tubes. To such tubes couplings can be made to carry fluid to and/or from the various compartments via the conduits 60, 61 and 62 of the stack in series flow by way of appropriate holes 40, 41, 42, 43, 44, 45, and 46, and connecting channels 50, 51, 52, 53, 54, 55 and 56 which are provided in the gasketed areas of the various members of the stack. Vacuum pumps (not shown) or other means may be provided at certain connector tubes to produce via conduit 61 the desired low pressure within the vapor compartments 9, or alternatively, a sweep gas may be pumped through the vapor compartments. Pumping means (not shown) are also provided at appropriate inlet connecting tubes for the passage of fluids respectively into feed compartments 8 and heating compartments 7 and for the withdrawal of fluids from said compartment.

The elements of the stack are provided in their gasketing areas with one or more holes or apertures 40 to 46 which are generally located in the margins of such elements. Certain holes in each spacer member are provided with channels or slits 50 to 56 which connect with the open interior of the spacers to allow a predetermined fluid stream to enter and/or leave the appropriate compartments, while other holes are provided without channels for by-passing other fluid stream to other compartments. The particular arrangement of the holes and channels is determined in part by the location of the fluid inlet and outlet connecting tubes on the apparatus and also of-course on the particular direction of fluid flow desired through the stack.

The drawing of FIG. 1 illustrates generally series flow internally through the stack of both the heat transfer stream through conduit 62 and the feed stream through conduit 60, both streams being separate from each other. The streams may be operated concurrently or counter-currently to each other as desired and are passed into one end of the stack and removed at the other opposite end. The passage of fluid streams to the appropriate compartments and their withdrawal therefrom is managed by the mainfold or conduit systems 60, 61 and 62 which run internally through the stack in the general direction designated by the arrows. These conduits are formed by alignment of the appropriate holes or apertures located in the gasketed stack elements.

The elements of the stack are normally provided with at east one vacuum manifold hole 41 in addition to a plurality of other fluid mainfold holes. The membranes 10 adjacent to each common vapor spacer 14 are normally provided in their gasketed area with manifold holes similar in number and location as the manifold holes in the said adjacent vapor spacer frame. The other elements of the stack also contain vacuum holes 41 similarly situated so that on assembly of the stack a vacuum conduit 61 is formed internally through the cell by alignment of said vacuum manifold holes. The vapor compartments 9 formed by spacers 14 are connected to their respective vacuum manifold holes 41 by means of narrow passageways or connecting channels 51. In operation, the fluid component permeating the membrane will vaporize into the vapor compartment and be removed therefrom through connecting channels 51 and finally withdrawn from the apparatus via vacuum conduit 61 and collected at the appropriate outlet connecting tube.

Each spacer located between a pair of heat transfer sheets or plates 11 defines a heating compartment 7 common to a pair of units or subassemblies. These heating spacers are provided with at least manifold apertures 42 and 43 which are connected with the fluid flow path area of the heating compartment by connecting passageways 52 and 53 respectively. Feed compartments 8 are similarly provided with at least manifold apertures 40, 44 and 45 and the respective accompanying connecting channels 50, 54 and 55 where required. The common heating compartment spacers 12 and heat transfer sheets 11 are also provided with at least manifold apertures 40, 44, and 45 which are aligned with similarly situated apertures 40, 44 and 45 of feed compartment spacer 13.

It will be noted that the membranes (and also the vapor spacers) in no case have manifold holes which are aligned with the influent and effluent connecting channel manifold holes of the adjacent feed spacers 13. By such an arrangement, the membrane area overlying the connecting channel areas 50, 54, 55 and 56 of the feed spacers will have a reduced tendency to bow into these connecting channels. Any bowing that might occur would in no event be harmful because due to the absence of a membrane manifold aperture in the area adjacent to the feed spacers connecting channels and accompanying apertures 40, 44, 45 and 46, there is no possible way for the feed solution located in conduit 60 to flow under the bowed area of the membrane into the vapor compartment.

It is preferable that two or more individual subassemblies be utilized in pairs (A and B, C and D, etc.) between the end pressure plates so that a vapor compartment 9 defined on both sides by membranes 10 will be common to each subassembly of the pair. The vapor compartment 9 will thus serve to receive permeate from the two adjacent feed compartments 8 as shown in the drawings. It is to be understood that additional subassemblies from that illustrated may be placed in a repeating arrangement between the terminal pressure end plates.

The operation of the apparatus and the improved manner of directing the fluid streams through the stack may be more fully described by referring in particular to FIG. 1 which illustrates a manner of distributing a stream 60 of a fluid feed mixture to each feed compartment 8 in a multi-unit stack by flowing said mixture internally through the stack in series from one feed compartment to another feed compartment and so on. Another fluid stream 62 of, for example, hot water is simultaneously passed in a series manner into and out of each heating compartment 7. A third stream 61, for example, a partial vacuum may be passed through each of a third set of compartments for example, vapor compartments 9. All streams are normally kept separate from one another. There may under some circumstances be a fourth and even a fifth stream. By the present invention, a feed stream of a liquid mixture, for example, an aqueous coffee extract having 25 percent solids, is passed by pumping means into the terminal plate inlet feed tube at a rate of about one gallon per hour and flows through conduit 60 as shown by the direction of the broken line arrows. The stack employed is comprised of three repeating unit pairs, (subassemblies A through F) with a total utilized membrane permeation area of about 40 ft². The feed mixture stream 60 after by-passing the feed compartment B8, of subassembly B and on entering inlet manifold aperture 45 of feed compartment C8 of subassembly C is caused to flow in a tortuous path across the said latter feed compartment to outlet manifold aperture 40. Since the adjacent membrane 10 of, for example, cellulose nitrate, does not have an aperture which aligns with outlet manifold aperture 40, the solution leaving this feed compartment is forced to flow back to the feed spacer B13, of subassembly B and into inlet aperture 40 Since the membrane 10 adjacent to the feed spacer of subassembly B also does not contain an aperture which aligns with manifold inlet aperture 40, the feed solution must flow across the feed compartment B8 to outlet manifold aperture 44 where it is then forced to flow once again in a direction towards the feed spacer C13 of subassembly C through manifold apertures 44 via conduit means 60. This stream 60 travels in a direction past subassemblies C and D until it enters manifold inlet hole 44 of the feed spacer E13 located in subassembly E. The stream then follows the same general path as was previously described with reference to subassemblies B and C, that is, it flows across and out of the feed compartment E8 of subassembly E, then back to the feed compartment D8 of subassembly D where it is then withdrawn at effluent aperture 45 and directed to the next adjacently placed subassembly (not shown). Eventually after passing in series flow through all the remaining feed compartments in the manner described, it is finally withdrawn from the apparatus at an appropriate outlet tube. It is collected as a 52 percent concentrated product at a rate of about 0.5 gallons per hour. The feed mixture solution can first be heated before entering the stack; preferably to a temperature of about 130° F. and its temperature maintained during its series passage through the stack by absorption of heat from the adjacent heating compartments 7. Heat transfer fluid, for example, water at a temperature of about 140° F. is continuously pumped into an inlet tube associated with the end pressure plate at about two gallons per minute and allowed to flow in series through each heating compartment of the stack via conduit system 62. In the passage of such fluid through the heating compartments the heat contained therein will be transferred to the feed mixture contained in the feed compartments by means of the separating heat transfer sheets or plates. On passage out of the stack the heat transfer fluid may be reheated and recirculated back to the stack.

The pressure in the vapor compartment 9 is maintained at a lower pressure than that in the feed compartment, for example, by a partial vacuum in the compartment by evacuation at the appropriate tube outlets using a vacuum pump or other suitable device. Water from the feed mixture solution (for example, a coffee extract) contained in feed compartment 8 will preferentially permeate the water permeable membrane 10 emerge from the lower pressure side of the membrane as a vapor where it is quickly removed via connecting channel 51. The vapor is withdrawn from the stack at outlet tubes associated with the pressure end plates and then condensed and finally collected at a rate of about 5 pounds per hour.

It should be noted particularly in FIG. 1 that the fluid feed mixture stream 60 in its passage through the feed compartment of a subassembly pair (such as subassemblies B and C) initially by-passes the first located subassembly or unit B prior to passing into and through the feed compartment C8 of the adjacently located second subassembly or unit C. The stream 60 then returns to the first unit B where it passes into and out of the unit's feed compartment B8, and then subsequently flows in its initial direction towards the next adjacently located unit pair D and E. It is readily seen that the feed stream 60 in its passage through the feed compartments of a subassembly pair (B and C) as above described requires four sharp 90° turns. In the prior art apparatus employing stream deflecting means as described in the aforementioned U.S. Pat. No. 3,398,091 there is required eight sharp 90° turns in the fluid stream direction to accomplish passage through the feed compartments of a subassembly pair. This excessive number of turns is due to the presence of two sets of stream deflecting means associated with the gasketing area of the heating spacers and incorporated within the feed stream manifold conduit path 60. The objective of this present invention of reducing the manifold hydraulic pressure drop is therefore readily accomplished by the elimination of those high pressure drop deflecting means employed in the prior art apparatus.

FIG. 2 illustrates the embodiment directed to an arrangement in which similar compartments located in separate subassemblies are fed in parallel flow from a single fluid stream that initially splits into a first and second feed stream. The fluid preferably do not enter and leave the apparatus through pressure plates located at the terminal ends of the apparatus as was described hereinabove with respect to FIG. 1, but instead generally by means of fluid connecting tubes or ports located on two or more side edges of the rigid vacuum spacer frame members. The first stream will pass in one direction to a certain subassembly and the second stream in another direction to an oppositely located subassembly. The streams after passing in parallel flow through similar compartments of the respective subassemblies will flow towards each other and combine once again into a single stream. Of-course the units or subassemblies are still arranged preferably in pairs between end plates having the necessary pressure means to obtain a fluid tight stack assembly. If desired it is permissible for some of the connecting tubes to be in association with the end plates and others with the side of the vacuum spacer frames.

In the apparatus illustrated the vacuum spacer frame shown common to a pair of units or subassemblies is provided with a set of inlet and outlet connecting tubes, 20,21,22,23, and 24 extending into oppositely located side edges of the spacer frame. Through these tubes fluid can be made to pass and be withdrawn from the appropriate compartments through internal conduits means formed by sets of aligned manifold holes. Each vacuum spacer frame 14 however does not necessarily carry the same number of tubes nor are their locations similar to their neighboring vacuum spacer. For example only every alternate vacuum spacer need be provided with connecting tubes 21, 24 and their associated manifold holes for the passage and removal of heating fluid to the respective heating spacers. Vacuum pumps 26, or other means may be provided at evacuation tubes 22 to produce the desired low pressure or partial vacuum within the vapor or vacuum compartments 9. Other pumping means 28,27 are provided at inlet ports 21,20 for passage of fluids respectively into the fluid heating compartments 7 and feed compartments 8 and for withdrawal therefrom at outlet tubes 24, and 23. To best describe parallel flow of both the feed stream 31 and heat transfer stream 30 attention is directed especially to the second common vacuum spacer located between subassemblies C and D. As shown therein the feed solution 31 designated by the broken line arrow is passed by a pump 27 into inlet tube 20 which is connected to feed conduit 60 formed by means of aligned manifold holes 44. The feed stream will divide into two half streams each initially going in completely opposite directions via conduit 60 formed by the appropriately located manifold holes. The first of said half stream will by-pass feed compartment C8 located in subassembly C, enter and leave feed compartment B8 located in subassembly B and then by means of manifold holes 40 flow back to the said second common vacuum spacer with its associated manifold hole 40 and outlet tube 23. The said second half stream follows the same general flow pattern as above described whereby it by-passes feed compartment D8 of subassembly D, enters and leaves feed compartment E8 of subassembly E and returns back to the second common vacuum spacer where it combines within manifold 40 with the said entering first half stream. The combined streams are thereafter withdrawn from the apparatus and collected at outlet tube 23. Both half streams flow in a direction which are mirror images to each other. In each case the feed compartments C13 and D13 located in the subassembly pair (C,D) that is associated with the second common vacuum spacer are not serviced by the feed stream 31 entering said second common vacuum spacer. Feed compartment C13 will be serviced through conduit 60 formed from manifold holes 45 from the feed stream 31 which enters the first common vacuum spacer associated with a subassembly pair A, B. Similarly feed compartment D13 will be serviced by the feed stream originating from the third common vacuum spacer associated with subassembly pair E,F, (not shown)

In a similar manner the heat transfer stream 30 is passed by a pump 28 into inlet tube 21 which is connected to the conduit formed by aligned manifold holes 43. This stream also splits into two streams with each stream initially flowing away from each other in completely opposite directions. The first of said streams will pass into the heating compartment 7 located in subassembly D and the second stream will pass into the heating compartment located in subassembly C. Both streams on passing out of their respective heating compartments will flow through the conduit 60 formed by manifold holes 42 in a direction towards each other back to the common vacuum spacer from which they originated. The streams meet and combine within the manifold hole 42 associated with the effluent tube 24 located on said vacuum spacer frame and thereafter this stream is removed from the apparatus and collected as desired. In this case it will be noted that the heating stream 30 entering the second common vacuum spacer will service the heating compartments located in those subassemblies which are adjacent to and separated by said second common vacuum spacer.

The desired lower pressure in the vacuum compartments 9 is obtained by evacuation at outlets 22 by a vacuum pump 26 or other suitable means. The number of said vapor outlets 22 employed throughout the stack may vary as desired but it is preferred that at least one outlet be located on a side of each vacuum spacer frame. Since each vacuum compartment 9 is serviced by its own separate vapor outlet 22, it is not necessary that their be manifold holes 41 forming an internal conduit 61 connecting all the vacuum compartments as shown in FIG. 2. In fact is is generally preferred that there be no manifolding between the vacuum spacers. By such as arrangement each vacuum compartment may be controlled directly and independently of the others to allow if so desired variations in the degree of evacuation employed therein. The number of subassemblies arranged between the end plates of a stack and the available membrane area employed can vary to a wide degree depending on the production rate desired. In the apparatus of FIG. 2 the effluent streams collected from the effluent tubes of one vacuum spacer frame member can serve as the influent stream to the next adjacently located vacuum frame member and flow continuously in a series arrangement into and out of a plurality of such frames.

Figure 3:
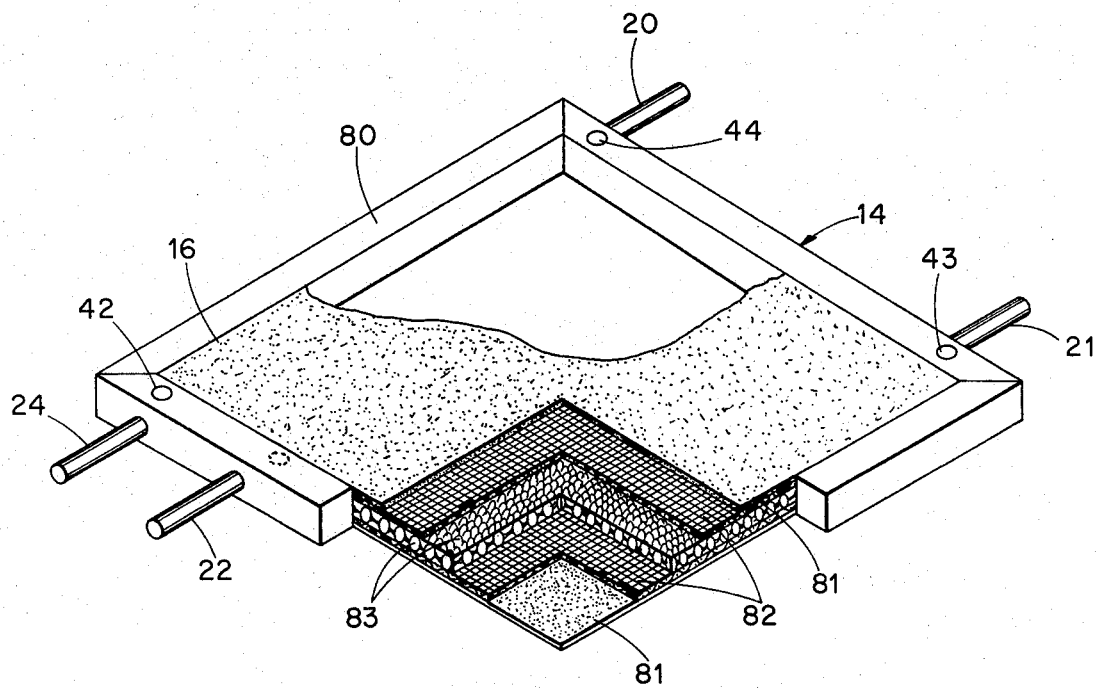
FIG. 3 is a perspective view partially in section showing a common vacuum spacer frame in association with a preferred embodiment of a membrane supporting structure.
Figure 4:
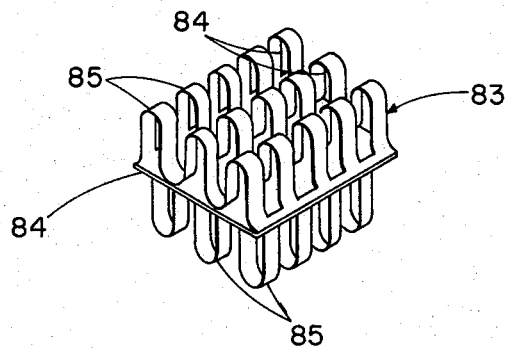
FIG. 4 is an enlarged detailed illustration of a preferred subsupporting foraminous element as is employed in the membrane supporting structure of FIG. 3.

FIG. 3 illustrates a common vacuum spacer with associated means for supporting the membrane since the membranes employed have little structural rigidity by themselves. The problem is one of supplying sufficient total member support without unduly obstructing the removal of vapor permeate from the membranes. In the form shown the common vacuum spacer member 14 for use particularly in the apparatus of FIG. 2 is provided with a solid, non-porous frame or rim 80 about the spacers external periphery. The frame contains at least one vapor tube 22 and connecting channel 51 communicating with the vapor compartment 9 and also manifold holes 42,43,44, and their associated tubes 24, 21, 20. The manifold holes do not communicate with the interior of the vapor compartment but merely go through the thickness of the frame. Other holes and tubes althrough not shown may be required. Because each membrane is placed directly against its respective supporting means 16, the membrane surface through which transfer takes place is restricted to the area which is exposed and not obstructed by the direct contact with the supporting means. In order to greatly increase the surface area of each membrane available for exposure to permeation, the invention in a preferred form comprises a thin spread sheet 81 of a highly porous or fine mesh material for example a fine mesh or woven screen of metal, plastic or other material placed in direct contact with the membrane surface. The fine screen is countersunk within the vacuum frame and presents a flat surface with the gasketing edge of the frame. A mesh size between 25 to 80 (U.S. Sieve Series) has been found satisfactory, the preferred mesh size range being between 45 to 55. Each fine mesh screen material is supported and in direct contact with an associated back-up screen 82 of much larger mesh or pore size. This back-up screen generally possesses a mesh or pore size three to six times larger than the finer screen; the preferred mesh size being between 5 to 10. Thus the vapor or vacuum compartment 9 enveloped within the spacer frame 80 is confined on both sides by the combination of a fine and coarse mesh or pore material. To give structural support to each pair of screens or porous sheets it was found advantageous to employ highly perforated subsupport means 82 placed between the two sets of screen pairs substantially filing the vapor compartment. The subsupport means 83 should be provided with a multiplicity of large channels or pores to provide passageways for vapor movement as unimpeded as possible but still provide complete support for the pairs of screen. The subsupporting element although possessing a highly foraminous or expanded structure should have a plurality of supporting points 85 in direct contact with each juxtapoised coarse mesh back-up screen. The subsupport may have a pyramidal or corrugated design. A particularly excellent subsupporting structure is one known as SUPER-TUBULUS having substantially oval type tubular openings 84 as shown in detail by FIG. 4. Structures having such a SUPER-TUBULUS design are available commercially from Krieg and Zivy Industries, Paris, France. The type employed in the present invention and found satisfactory was constructed of 316 stainless steel with the long axis of the tubular opening measuring about three-fourths inch and the short axis about three-sixteenths inch. SUPER-TUBULUS as well as commercially available expanded metal mesh is the preferred material for use as the foraminous subsupporting structure. Both materials are made by cutting rows of a series of fine slits in a sheet of the desired material. To form the expanded mesh material the sheet is pulled perpendicular to the long axis of the slits resulting in the expansion of the slits to form essentially expanded diamond shaped holes. In the case of the SUPER-TUBULUS supporting structure it appears that two opposite ends of the sheet are pushed together parallel to the direction of the slits forcing the metal defined within the area of two adjacent slits to buldge and push away as a metal strip in a direction perpendicular to the face of the sheet. The forcing is controlled to allow every alternate metal strip in each row to buldge out in one direction and the remaining strips in the row in a diametrically opposite direction to form the tubular openings 84 and associated support points 85.

Figure 5:
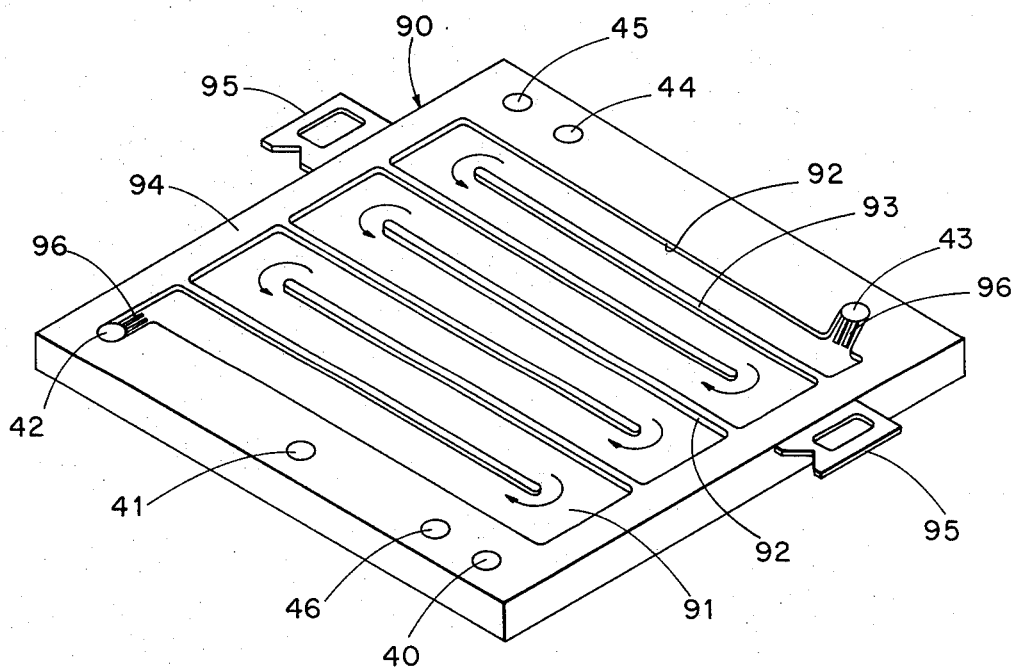
FIG. 5 is a perspective view of a composite heat transfer-fluid feed compartment spacer component which can be employed in the membrane separation apparatus.

In FIGS. 1 and 2 the heat transfer sheet 11 is shown as a separate entity from that of its adjacent fluid feed compartment 8. However, the preferred embodiment is to fabricate these two elements into a single integral structure comprising a composite heat transfer plate-fluid feed compartment. FIG. 5 shows a perspective view of a preferred type of the composite element 90 constructed for example of a 0.080 inch thick, flat, stiff and durable plate of thermally conductive material such as stainless steel and the like. On one face of the sheet is a tortuous fluid flow path 91 which has been chemically milled or etched into the surface of the plate for a depth of about 0.020 inch. This single continuous flow path is defined by walls 92 terminating in edges with the axis of the path preferably running parallel to the face of the plate. The depth and length of the etched or recessed area 91 may vary within wide limits but is preferably kept to a minimum thickness provided the hydraulic pressure drop resulting therefrom is acceptable under the contemplated use. The series of integral prejections forming long ribs 93 will direct a liquid between manifold holes 42 and 43 to flow in a continuous channel. In practice many more integral ribs may be used than that illustrated and the recessed flow path area may have designs other than that specifically shown. In close proximity to the inlet and outlet manifold holes there may be located a series of integral projections or short ribs 96 which may vary in number and shape. On assembly of the stack the adjacent membrane will contact and gasket against the flat surfaces of the peripheral frame area 94 and that of the projecting long and short ribs. For this reason the gasketing area should be smoothly coated with a chemically and heat resistant, slightly pliable plastic to assist in forming a leak proof seal with the adjacent membrane. Preferably the entire side of the composite heat transfer-fluid feed compartment 90 containing the flow path 91 should have its surface completely coated with at least a 1 mil coating of a commercially available plastic material. The fluorocarbon elastomers are the preferred coating material and include for example, tetrafluoroethylene, (TEFLON), chlorotrifluoroethylene (KEL-F), fluorinated ethylene-propylene (FEP), polyvinylidene fluoride (PVF) and the like. This will provide an exceptionally smooth and nonstick surface in the flow path area so as to reduce the tendency for the adhesion and deposition of solids from the fluid mixture traversing the flow path areas especially where the fluid mixture comprises liquid food solutions such as coffee extract, whey etc. TEFLON is a particularly good coating material since it will lessen the possibility of the membranes sticking strongly against the gasketing areas so that on disassembly of the stack the membranes can be removed without tearing or otherwise damaging the same.

The reverse face of the composite plate (not shown) functions as the heat transfer area and as such may remain as a flat surface. On assembly of the stack, this flat heat exchanger surface will contact and lie against the adjacent heating spacer 12. The composite plate 90 is also provided with a plurality of the mainfold holes 40, 41, 44, 45 and 46 located in the peripheral gasketing frame area to allow fluids to bypass the said feed compartment on their passage to or from other compartments of the subassembly stack. A pair of arms 95 may be used to facilitate handling and for support of the plate.

The number of subassemblies employed between the end plates of a stack and the membrane area available for transport can of course vary depending on the volume of feed required to be processed. A plurality of consecutively arranged permeation stacks may be used to effect a high degree of concentration or separation, in which case the effluent mixture from one stack may serve as the influent feed mixture to the next stack, and so on. The permeation apparatus may be employed in a continuous operation or may be applicable to batch type or feed and bleed systems.

The description of the invention and the drawings have been made with specific reference to a membrane permeation (pervaporation) apparatus and process; however, the invention is not to be construed as limited thereto except as defined in the appended claims and is, in particular, useful also in mass diffusion, gaseous diffusion (molecular effusion) dialysis, electrodialysis, piezodialysis, thermodialysis, osmosis, electroosmosis, piezoomosis (reversed osmosis) theremoosmosis, ultrafiltration (hyperfiltration), electrodecantation and other membrane separation processes.

The embodiment of the invention in which an exclusive property or privilage is claimed are defined as follows:

1. A membrane support spacer comprising a frame section defining a compartment substantially filled with a porous support member nesting within the frame of said spacer, said frame section containing aperture means, the said porous support member having on both major faces finely porous sheet means presenting a substantially flat surface flush with the surface of said frame, each side of said finely porous sheet means facing the interior of the said compartment being in contact with a more coarsely porous back-up sheet support means, said coarse sheet means further supported with highly foraminous subsupport means disposed between said back-up sheet means and substantially bridging the space therebetween, said subsupport means having a plurality of supporting points contacting each of said coarsely porous sheet means, the said subsupport means comprising a metal sheet having rows of slits cut therein, the strip of metal defined within the area of two adjacent slits extending or bulging outwardly in a direction perpendicular to the surface of said metal sheet with the top or most extended portion of said bulge forming the said supporting points, the alternate metal strips in each row bulging or extending outwardly in one direction with the remaining metal strips of the said row extending outwardly in an opposite direction, forming a substantially tubular shaped opening for providing passageways for unimpeded vapor movement therethrough.

2. The frame section of claim 1 characterized in that at least some of said aperture means contained therein are in communication with port means extending outwardly to an exterior side edge of said frame to provide inlets and outlets for the flow of fluids into and out of said apertures.

3. A membrane support spacer comprising a frame section defining a compartment substantially filled with a porous support member nesting within the frame of said spacer, said frame section containing aperture means, the said porous support member having on both major faces a 30 to 80 fine mesh size screen presenting a substantially flat surface flush with the surface of said frame, each side of said fine screen facing the interior of the said compartment being in contact with coarse screen material having a mesh size three to six times larger than said fine screen, said coarse screen being supported with highly foraminous subsupport means disposed between said coarse screens and substantially bridging the space therebetween, said subsupport means having a plurality of supporting points contacting each of said coarse mesh screen, the said subsupport means comprising a metal sheet having rows of slits cut therein, the strip of metal defined within the area of two adjacent slits extending or bulging outwardly in a direction perpendicular to the surface of said metal sheet with the top or most extended position of said bulge forming the said supporting points, the alternate metal strips in each row bulging or extending outwardly in one direction with the remaining metal strips of the said row extending outwardly in an opposite direction, forming a substantially tubular shaped opening for providing passageways for unimpeded vapor movement therethrough.

4. A membrane support spacer comprising a frame section defining a compartment substantially filled with a porous support member nesting within the frame of said spacer, said frame section containing aperture means, the said porous support member having on both major faces a fine screen of about a 50 mesh size presenting a substantially flat surface flush with the surface of said frame, each side of said fine screen facing the interior of the said compartment being in contact with coarse screen material having a mesh size of about 10, saiD coarse screen being supported with highly foraminous subsupport means disposed between said coarse screens and substantially bridging the space therebetween, said subsupport means having a plurality of supporting points contacting each of said coarse mesh screen, the said subsupport means comprising a metal sheet having rows of slits cut therein, the strip of metal defined within the area of two adjacent slits extending or bulging outwardly in a direction perpendicular to the surface of said metal sheet with the top or most extended portion of said bulge forming the said supporting points, the alternate metal strips in each row bulging or extending outwardly in one direction with the remaining metal strips of the said row extending outwardly in a diametrically opposite direction, forming a substantially oval shaped opening for providing passageways for unimpeded vapor movement therethrough, the long axis of the opening measuring about three-fourths inch and the short axis about three-sixteenths inch.

* * * * *